March 4, 1958
J. KINZELMAN
2,825,156
TEMPERATURE CONTROL FOR IRONING MACHINES
Filed Jan. 13, 1956
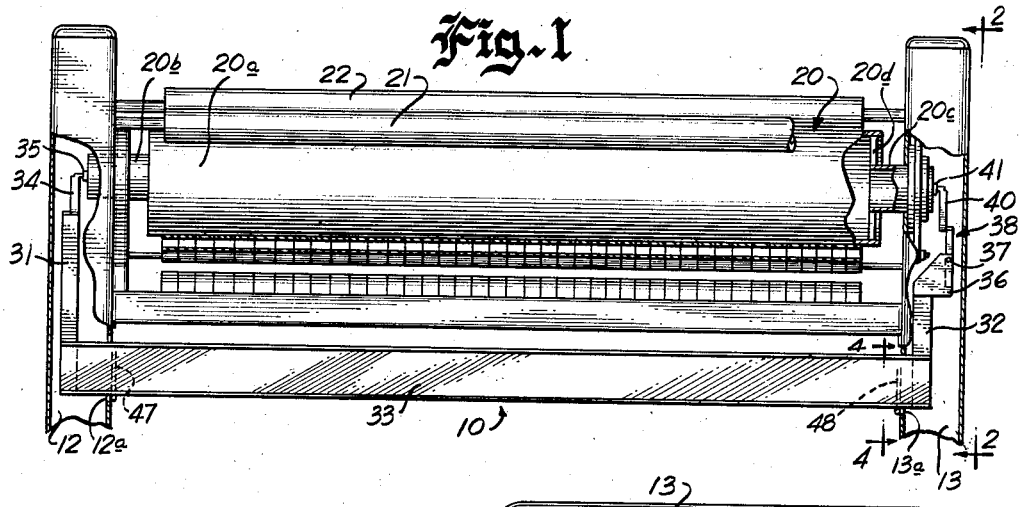
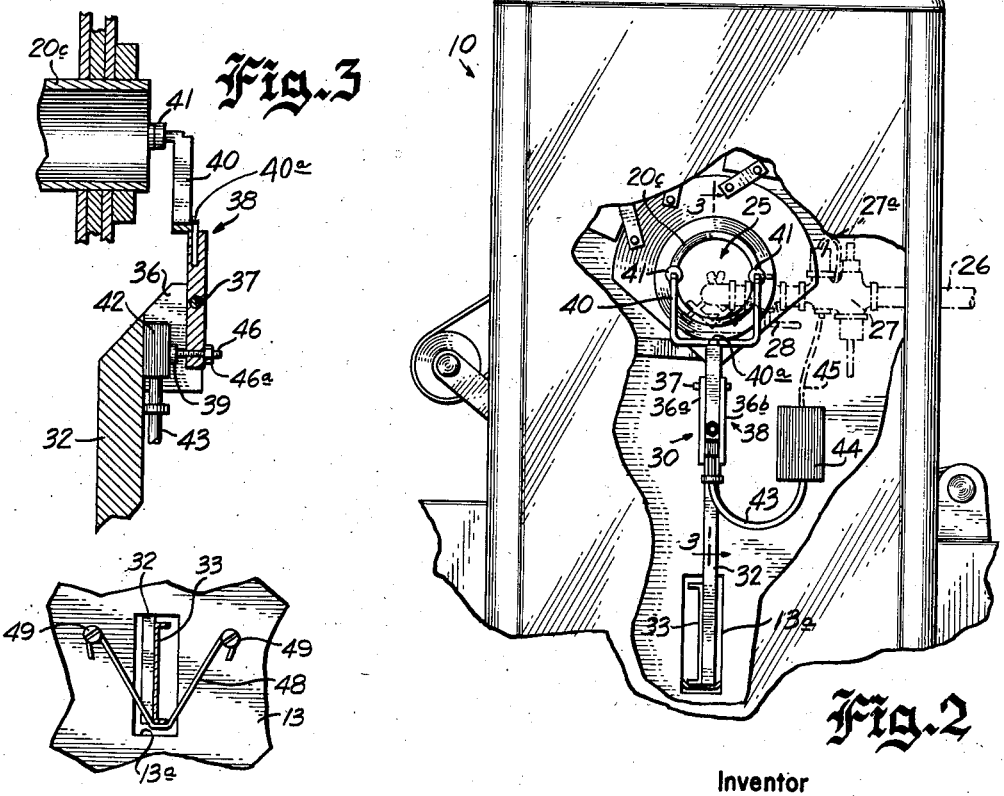
Inventor
JOSEPH KINZELMAN
by
Mason, Kolehmainen, Rathburn and Wyss.
Attorneys United States Patent Office 2,825,156
Patented Mar. 4, 1958

2,825,156

TEMPERATURE CONTROL FOR IRONING MACHINES

Joseph Kinzelman, Northbrook, Ill., assignor to Gasway Corporation, Chicago, Ill., a corporation of Illinois Application January 13, 1956, Serial No. 558,925

14 Claims. (Cl. 38—44)

This invention relates to temperature control apparatus for mangles or ironing machines and, particularly, to such apparatus as used for controlling the operating temperature of the main ironing cylinder in machines of the type employed in commercial laundries.

Specifically, the present invention relates to improvements in temperature control apparatus for power driven ironers of the type employing at least one heated cylinder or roll having means cooperating therewith to form an ironing zone in which work is pressed or ironed. In devices of this character it has been conventional to control the application of heat to the interior of the main cylinder automatically in response to the axial thermal expansion of the cylinder. Generally, however, in the prior art arrangements the expansion-responsive means has been mounted upon the main frame of the ironing machine and has usually comprised an assembly in engagement with only one end of the heated cylinder. When the temperature control apparatus is mounted in this manner, it is subject to variations as a result of distortion and warping of the frame due to the heat attendant upon the ironing operation. Moreover, heat transfer between the main frame and the temperature control apparatus by way of conduction adversely affects the control operation. Thus, it has been difficult to maintain the temperature of the heated roll accurately at the desired predetermined value suitable for ironing the work. In addition, the temperature control apparatus of the prior art has been somewhat sluggish in operation, by virtue of the aforementioned mounting and also as a result of the single-ended control referred to above. Thus, there has been considerable temperature span between the actuation and deactuation of the heat control means upon expansion and contraction of the heated roll. As a result, the temperature of the roll may fluctuate to an undesirable degree and proper ironing temperatures cannot be maintained.

It is a primary object of the present invention, therefore, to provide a temperature control apparatus which is very accurate in operation and is capable of maintaining a substantially uniform temperature of the heated roll for the efficient performance of ironing operations.

Another object of the invention is to provide a temperature control apparatus in which the heat control is rendered effective and ineffective by a relatively small change in the axial dimensions of the heated cylinder, thus providing a highly accurate control.

A further object of the invention is to provide a temperature control for ironing machines in which the predetermined limits of temperature variation of the main roll are relatively close together, thereby providing for the maintenance of a substantially constant temperature of the heated cylinder.

Still another object of the present invention is to provide a novel temperature control apparatus which is mounted upon an ironing machine in such manner that the heat control is substantially unaffected by distortion of the main frame of the machine as a result of the high temperatures to which the frame is subjected.

The invention, both as to its organization and method of operation, together with further objects and advantages thereof, will best be understood by reference to the specification taken in conjunction with the accompanying drawing, in which:

Fig. 1 is a fragmentary front elevational view of the ironing machine of the present invention with certain of the panels and other elements being broken away to facilitate the illustration;

Fig. 2 is an enlarged fragmentary, partially broken away view looking endwise in the direction of the arrows 2—2 in Fig. 1;

Fig. 3 is an enlarged fragmentary sectional view taken along a line substantially corresponding to the line 3—3 in Fig. 2; and Fig. 4 is an enlarged fragmentary sectional view taken along a line substantially corresponding to the line 4—4 in Fig. 1.

Referring now to the drawing, and more particularly to Figs. 1 and 2 thereof, the present invention is there illustrated as embodied in an ironing machine generally indicated by the reference numeral 10. This ironing machine is disclosed and described in detail in applicant's copending application Serial No. 558,927 filed simultaneously herewith and assigned to the same assignee as the present invention. Briefly considered, the ironing machine of the present invention comprises a pair of spaced apart end sections 12 and 13 interconnected by suitable braces (not shown) to form a framework. Rotatably journaled within the end sections 12 and 13 are an internally heated main roll or cylinder 20 and a number of ironing or pressure rolls 21, 22, etc., biased into contact with a portion of the periphery of the main roll and cooperating therewith to define an ironing zone in which work to be ironed is advanced. As is conventional in this art, the ironing rolls 21, 22, etc., are covered with cloth or other padding material and are driven simultaneously with the main roll or cylinder 20. The latter cylinder includes an enlarged central portion 20a having a pair of smaller diameter hubs or trunnions 20b and 20c at its respective ends. The central portion 20a and the hubs 20b and 20c are connected together to form an integral unit by a plurality of radially extending spokes 20d shown in Fig. 1.

As indicated above, the main roll 20 is internally heated by gas burner means 25 extending through the main roll throughout its entire length. The supply of fuel for the gas burner means 25 is delivered from a gas inlet pipe 26 through a solenoid-controlled valve 27 and through a manually actuated valve 28. The manually actuated valve may be employed to regulate the height of the flame emanating from the burner means 25, while the solenoid-controlled valve 27 is adapted to be controlled in a manner described more fully below automatically to maintain the temperature of the main roll 20 at a value suitable for performing the desired ironing operation. In one installation of the present invention, optimum results were found to be achieved when the temperature of the main roll was maintained at approximately 375° Fahrenheit, although obviously other temperatures in this general vicinity could be employed if desired.

The solenoid-controlled valve 27 is adapted to be actuated by a temperature control means indicated generally at 30. The latter temperature control means, in accordance with an important feature of the present invention, includes a caliper or micrometer formed by a pair of vertically extending arms 31 and 32, respectively disposed within the end sections 12 and 13 and interconnected by a horizontally extending leg 33. The latter leg passes through an opening 12a in the end section 12 and through an opening 13a in the end section 13 with the openings 12a and 13a being so dimensioned that the leg 33 does not touch or contact their edges, thus preventing a transfer of heat by conduction from the frame of the ironing machine to the caliper. The extreme upper end of the vertically extending arm 31 supports a bracket 34 having spaced legs each carrying a contact button 35 in engagement with the hub 20b of the main roll 20. The upper end of the vertically extending arm 32, on the other hand, carries a mounting bracket 36 having spaced wall portions 36a and 36b embracing the arm 32 and interconnected by a pivot pin 37. An assembly 38 mounted on the pivot pin 37 carries at one end an adjustable bolt 46 terminating with a switch operating button 39. The bolt 46 is threaded into a tapped bore in the lower end of the assembly 38 and is held in position by a nut 46a which may be loosened to permit adjustment of the bolt in order to alter the position of the button 39. The assembly 38 further comprises at its upper end a support bracket 40 pivotally movable about a vertical axis provided by pivot pin 40a and including a pair of upstanding or vertically extending legs carrying contact buttons 41 in engagement with diametrically opposed portions of the hub 20c of the main roll. In order to isolate the temperature control apparatus insofar as possible from heat transfer from the main roll 20 by way of conduction, the buttons 35 and 41 are preferably formed of relatively poor heat conducting material. Moreover, the use of a pair of spaced buttons 35 or 41 in engagement with diametrically opposed regions of each of the hubs 20b and 20c insures an accurate response of the temperature control apparatus. Thus, if a single button were employed engaging the hub 20b or 20c, the hotter portions of the main roll, i. e. those portions disposed above the flame from the burners, would expand to a greater extent than the cooler portions and, as a result, the single button would be moved back and forth as the hub rotates. The use of spaced buttons mounted upon the assembly 38 which is movable about the pivot axis 40a averages the thermal expansion on opposed sides of the main roll and, hence, provides a more accurate control.

A microswitch 42 of conventional construction is mounted in fixed position on the vertically extending arm 32 and is adapted to be engaged and actuated by the operating button 39. The microswitch 42 is connected through a conduit 43 to an electrical connection box 44 and, from there through an electrical conductor 45 to the coil of the solenoid 27a controlling the valve 27, whereby the solenoid may be controlled by the opening and closing of the microswitch 42. Specifically, whenever the temperature within the main roll is below the desired predetermined value, the solenoid-controlled valve 27 remains open to permit a full flow of gas from the inlet line 26 to the burner means 25. As soon as the burner means has supplied a sufficient amount of heat internally of the main roll to raise the temperature to the predetermined value, the main roll 20 will have expanded axially to an extent sufficient to pivot the assembly 38 about the pin 37 in a clockwise direction as viewed in Fig. 3 until the operating button 39 engages and closes the microswitch 42. With the microswitch closed, an electrical circuit is completed to energize the solenoid coil 27a and close the solenoid-controlled valve 27, with the result that the flow of gas to the burner means 25 is interrupted or is greatly reduced. When the supply of heat within the main roll 20 is terminated or reduced, the temperature will, of course, begin to drop and a resultant axial contraction of the main roll will occur. However, after a temperature drop of only a few degrees, the described contraction is sufficient to move the operating button 39 in a counter-clockwise direction as viewed in Fig. 2, thereby to open the microswitch 42 and break the electrical circuit controlling the solenoid coil 27a. As a result of the latter action, the valve 27 is opened and flow of gas from the inlet line 26 to the gas burner means 25 is restored in order again to supply heat internally of the main roll 20. In this manner, the temperature of the main roll 20 is maintained within upper and lower limits which are separated by only a few degrees in temperature.

The temperature at which the microswitch 42 will be closed may be altered by adjusting the bolt 46 to move the operating button 39 toward or away from the microswitch. In this manner, the amount of axial expansion of the main roll necessary to close the microswitch may be regulated, thus controlling the operating temperature of the main roll 20.

In accordance with another important feature of the present invention, the caliper is supported from the main frame of the ironing machine by means of a pair of spaced flexible suspension wires 47 and 48, respectively secured to the end sections 12 and 13. Specifically, as best shown in Fig. 4 of the drawing, the suspension wire 48 is attached to the end section 13 in any suitable manner, as by means of spaced bolts or screws 49, thus forming a cradle for receiving and supporting the horizontally extending leg 33 of the caliper. The length of the wire 48 is preferably selected to maintain the leg 33 out of engagement with the top and bottom of the opening 13a and the same is true of the suspension wire 47 on the end section 12. The suspension wires 47 and 48 comprise the sole supporting means for the caliper carrying the temperature control apparatus, with the result that transfer of heat between the main frame and the temperature control means is minimized. Except for the wires 47 and 48 there is no physical contact between the frame of the ironing machine and the caliper. Moreover, the suspension wires 47 and 48 provide a bias type mounting for the caliper so that the regulation effected by the temperature control means 30 is substantially unaffected by dimensional changes of the frame of the ironing machine as a result of the high temperatures to which this frame is subjected. Accordingly, the temperature control means 30 is responsive almost exclusively to the axial expansion of the main roll 20, with the result that it is capable of maintaining an accurate predetermined temperature on the ironing surface of the main roll.

While a particular embodiment of the invention has been shown and described, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. In an ironing machine, a frame; a hollow cylindrical roller carried by said frame; a heater for said roller; and means for controlling the heater in accordance with the longitudinal axial thermal expansion of the roller, the last-named means comprising a caliper supported by the frame and having an element in engagement with one end of the roller, a member supported upon said caliper and in engagement with the other end of said roller, said member being movable in response to thermal axial expansion of said roller, and means responsive to the movement of said member as a result of said axial expansion for controlling the heater.

2. In an ironing machine, a frame; a hollow cylindrical roller carried by said frame; a heater for said roller; and means for controlling the heater in accordance with the longitudinal axial thermal expansion of the roller, the last-named means comprising a caliper supported by the frame and having an element in engagement with one end of the roller, a member pivotally supported upon said caliper, means urging said pivoted member into engagement with the other end of said roller whereby said member is pivoted by axial thermal expansion of said roller, and means responsive to the pivotal movement of said member as a result of said axial expansion of said roller for controlling the heater.

3. In an ironing machine, a frame; a hollow cylindrical roller supported by said frame; a heater for said roller; and means for controlling the heater in accordance with the longitudinal axial thermal expansion of the roller, the last-named means comprising a caliper having an element in engagement with one end of the roller, flexible means for suspending said caliper from said frame and comprising the sole support for the caliper, a member pivotally supported upon said caliper, means maintaining said pivoted member in engagement with the other end of said roller whereby said member is pivoted by axial thermal expansion of the roller, and means responsive to the pivotal movement of said member as a result of said axial expansion of said roller for controlling the heater.

4. In an ironing machine, a frame; a hollow cylindrical roller rotatably journaled on said frame; a heater for the interior of said roller; and means for controlling the heater in accordance with longitudinal axial thermal expansion of the roller, the last-named means comprising a pair of generally vertical arms interconnected by a generally horizontal leg to form a caliper, flexible means for suspending said caliper from said frame and comprising the sole support for the caliper, one of the vertical arms of said caliper being in engagement with one end of the roller and the other of said vertical arms being disposed adjacent the other end of said roller, a member pivotally supported upon said other vertical arm, means holding said pivoted member in engagement with said other end of said roller so that said member is pivoted by axial thermal expansion of the roller, and means responsive to the pivotal movement of said member as a result of said axial expansion of said roller for controlling the heater.

5. In an ironing machine, a frame; a hollow cylindrical roller rotatably journaled on said frame; a heater for the interior of said roller; and means for controlling the heater in accordance with longitudinal axial thermal expansion of the roller, the last-named means comprising a pair of generally vertical arms interconnected by a generally horizontal leg to form a caliper, a pair of flexible wires connected to said leg at spaced positions for suspending said caliper from said frame, said wires comprising the sole support for the caliper, one of the vertical arms of said caliper being in engagement with one end of the roller and the other of said arms being disposed adjacent the other end of said roller, a member pivotally supported upon said other arm, means holding said pivoted member in engagement with said other end of said roller whereby said member is pivoted upon thermal axial expansion of the roller, and means responsive to the pivotal movement of said member as a result of said axial expansion of said roller for controlling the heater.

6. In an ironing machine, a frame; a hollow cylindrical roller supported by said frame; a heater for said roller; and means for controlling the heater in accordance with the longitudinal axial thermal expansion of the roller, the last-named means comprising a caliper having an element in engagement with one end of the roller, a pair of spaced flexible means for suspending said caliper from said frame, a member supported upon said caliper and in engagement with the other end of said roller, said member being movable in response to axial thermal expansion of the roller, and means responsive to the movement of said member as a result of said axial expansion of said roller for controlling the heater.

7. In an ironing machine, a frame; a hollow cylindrical roller supported by said frame; a heater for said roller; and means for controlling the heater in accordance with the longitudinal axial thermal expansion of the roller, the last-named means comprising a support structure, a pair of horizontally spaced flexible means for suspending said structure from said frame, a member supported upon said structure and in engagement with one end of said roller, said member being movable by axial thermal expansion of the roller, and means responsive to the movement of said member as a result of said axial expansion of said roller for controlling the heater.

8. In an ironing machine, a frame; a hollow cylindrical roller supported by said frame; a heater for said roller; and means for controlling the heater in accordance with the longitudinal axial thermal expansion of the roller, the last-named means comprising a support structure, flexible means for suspending said support structure from said frame and comprising the sole support for the structure, a member supported upon said structure and in engagement with one end of said roller, said member being movable by axial thermal expansion of the roller, and means responsive to the movement of said member as a result of said axial expansion of said roller for controlling the heater.

9. In an ironing machine, a frame; a hollow cylindrical roller supported by said frame; a heater for said roller; and means for controlling the heater in accordance with the longitudinal axial thermal expansion of the roller, the last-named means comprising a support structure, a pair of spaced flexible means for suspending said structure from said frame, a member pivotally supported upon said structure, means maintaining said pivoted member in engagement with one end of said roller whereby said member is pivoted by axial thermal expansion of the roller, and means responsive to the pivotal movement of said member as a result of said axial expansion of said roller for controlling the heater.

10. In an ironing machine; a frame; a cylindrical roller carried by said frame; a heater for said roller; and means for controlling the heater in response to longitudinal, axial, thermal expansion of said roller, the last named means including a pair of spaced elements in engagement with spaced apart points at an end portion of the roller, said points being located at substantially diametrically opposed positions on said end portion, movable support means carried adjacent the ends of said roller for mounting said elements, and means controlled by movement of said elements and said support means in response to axial thermal expansion of the roller for rendering the heater automatically effective to supply heat to the roller, said support means being moved by an amount which is average of the axial expansion of said roller at said spaced apart points.

11. In an ironing machine; a frame; a roller rotatably supported upon said frame; a heater for said roller; and means for controlling the heater in response to thermal expansion of the roller, said last named means including an element in engagement with the roller and movable in response to thermal expansion of the roller, means supporting said element, and flexible means suspending the supporting means from said frame so that the movement of said element is independent of expansion or contraction of said frame.

12. An ironing machine; a frame; a cylindrical roller carried by said frame; a heater for said roller; and means for controlling the heater in response to longitudinal, axial, thermal expansion of said roller, the last named means including a pair of contact buttons having relatively low heat transfer characteristics in engagement with spaced apart points at an end portion of the roller, support means carried by said frame and including a pivotally mounted member supporting both of said buttons, and means controlled by movement of said buttons and said member in response to axial, thermal expansion of the roller for rendering the heater automatically effective to supply heat to the roller.

13. The apparatus defined by claim 12 wherein switching means actuated by pivotal movement of said member in response to axial, thermal expansion of said roller is included in the heat controlling means.

14. In an ironing machine; a frame; a cylindrical roller carried by said frame; a heater for said roller; and means for controlling the heater in response to longitudinal, axial, thermal expansion of said roller, the last named means including a pair of elements in respective engagement with spaced apart points at an end portion of the roller, support means for mounting said elements, said support means including a caliper spanning the roller, a pair of spaced apart flexible members suspending said support means from said frame, and means controlled by movement of said elements in response to axial, thermal expansion of the roller for rendering the heater automatically effective to supply heat to the roller.

References Cited in the file of this patent

UNITED STATES PATENTS 1,605,027     Himes                    Nov. 2, 1926